United States Patent [19]
Mitsuishi et al.

[11] 3,912,297
[45] Oct. 14, 1975

[54] COLLAPSIBLE CANOPY ASSEMBLY
[75] Inventors: Yoshiji Mitsuishi, Yokohama;
Tomio Uchida, Sagamihara, both of Japan
[73] Assignee: Caterpillar Tractor Company, Peoria, Ill.
[22] Filed: Nov. 19, 1974
[21] Appl. No.: 525,234

[30] Foreign Application Priority Data
Nov. 24, 1973 Japan............................ 48-134645

[52] U.S. Cl.............................. 280/150 C; 296/107
[51] Int. Cl.².......................................... B62D 25/06
[58] Field of Search.......... 280/150 C; 296/107, 102

[56] References Cited
UNITED STATES PATENTS
3,472,550 10/1969 Marco................................. 296/107
3,713,688 1/1973 Monroe......................... 280/150 C
3,762,761 10/1973 Erickson............................. 296/107

Primary Examiner—Robert R. Song
Attorney, Agent, or Firm—Phillips, Moore, Weissenberger Lempio & Strabala

[57] ABSTRACT

This invention relates to an improved collapsible canopy assembly comprising a roof, supports and diagonal stays, which is a protective device mounted on an operator's station on a construction machine and which is raised or lowered safely by both flexible diagonal stays on both sides of the protective device.

8 Claims, 5 Drawing Figures

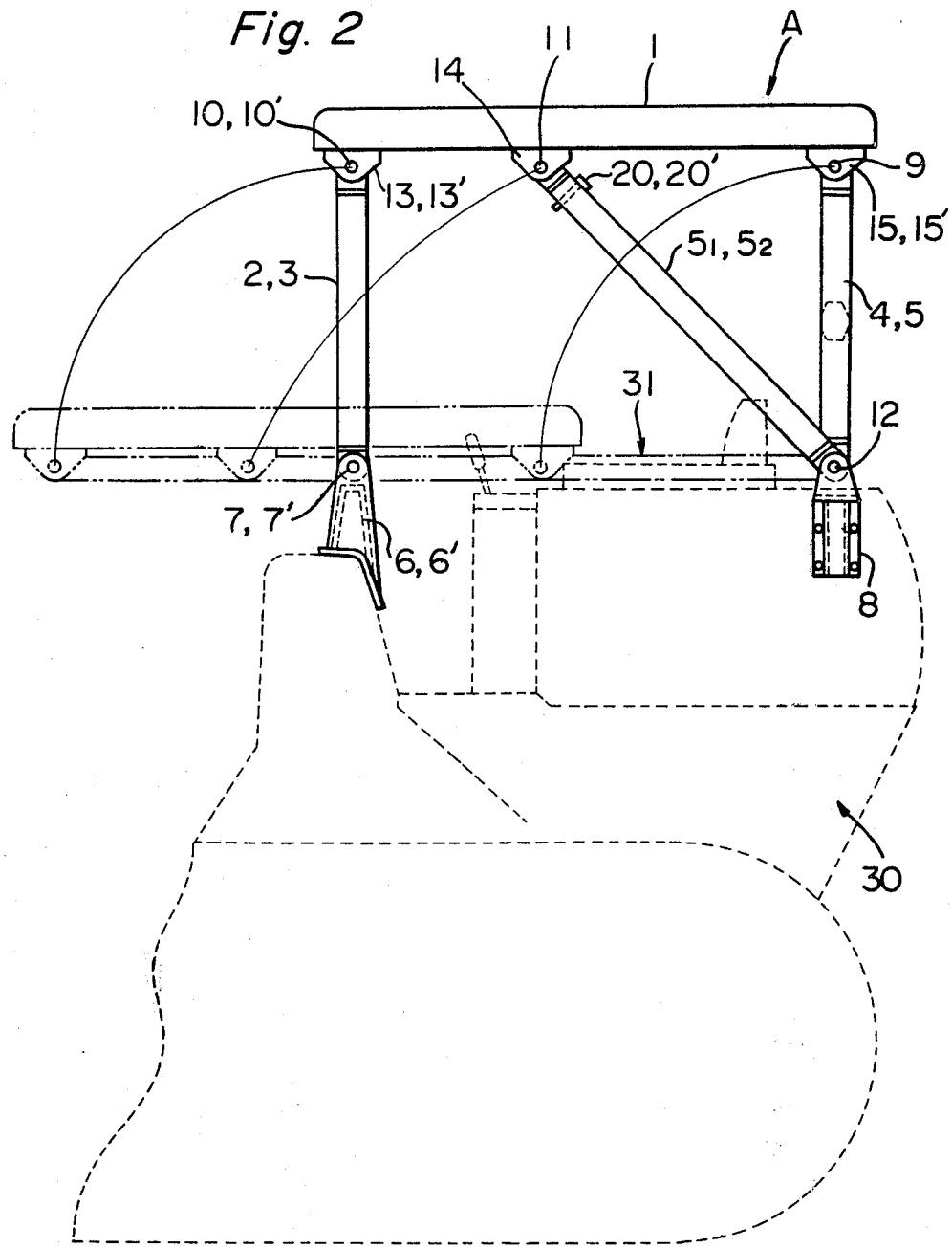

COLLAPSIBLE CANOPY ASSEMBLY

BACKGROUND OF THE INVENTION

The present invention relates to improvements of a collapsible canopy assembly, which is a protective device mounted above an operator's station of a construction or earth-moving machine, serving as a canopy top, a head guard (protection from falling object) and a roll-over protective structure.

The protective device is disposed above an operator's station at the rear of the machine and the operator operates the machine sitting within the protective device, which comprises a roof, four supports and brackets by which to secure the supports to the machine over the operator's station. Thus the protective device projects above the operator's station. The projection often causes some troubles. That is, since the machine cannot run fast as compared with general vehicles, it is usually carried on a trailer. With the device projected, the machine becomes higher and happens to violate the legal height limitation in traffic laws. In tunnel construction, a "jumbo drill" is in use and the canopy assembly stands in its way. The machine must pass through the jumbo drill without the projected protective device. As a countermeasure, a collapsible canopy assembly has been devised. If it is callopased and flattened to shorten the height, there occurs no traffic law violation and free pass of the machine is possible in a tunnel despite the presence of a jumbo drill. The collapsed and flattened protective device is thereafter erected as a vertical shape for its proper use. The operations of the protective device should be carefully carried out. The problems are the strength of the assembly as a whole due to a collapsible structure and the procedures of collapsing or raising the protective device.

The first problem of strength of the assembly depends upon its weight — lightweight or heavyweight. When it is just a sun-shade or rain-cover for an operator's station, roof materials may be reinforced fiber glass or simply a framed waterproof cloth and hence the supports for supporting the device may be light in weight. In such a lightweight protective device, the collapsing parts are not prone to damage from various vibrations, and collapsing procedures need only one operator. Further hazard or operating danger lessens.

In contrast, in a heavyweight collapsible canopy assembly, that is, in the protective device constructed to protect an operator in view of the protective standards, the roof and four supports increase weight and owing to this weight, damage is likely to occur in the collapsible connecting portions. Further during the operations, the supports are likely to be broken through various vibrations of the machine.

A heavyweight collapsible canopy assembly will need labor of more than one operator at the time of collapsing.

With reference to the prior art canopy connection illustrated in FIG. 1, this will be described below.

FIG. 1 shows partly a connection between the lower part of support 50 of the collapsible canopy assembly and bracket 51 on an operator's station in the prior art. Bracket 51 is secured to the machine encircling an operator's station. At the lower end of support 50 are disposed two vertically spaced pin holes and at bracket 51 are disposed holes 54 and 55, which match said pin holes for insertion of pivot pins 52 and 53 therein. Thus support 50 can not rotate except upon pulling out pin 53, whereby support 50 can be folded in the arrow direction with the fulcrum at upper pin 52. Such restraint can be maintained by such arrangements of one or more supports to keep the canopy assembly vertical. As described above, when the canopy assembly is light in weight, it works. When it comes to a heavyweight assembly, as a pin is pulled out, each support falls down in the same direction at a time; therefore, it is necessary that each support be held manually, etc. and brought down at low speeds. It cannot be operated by only one operator. Two or more operators are required.

SUMMARY OF THIS INVENTION

The present invention has eliminated the aforesaid two disadvantages. In a collapsible canopy assembly comprising a roof, four supports, and brackets for securing the supports to the machine over the operator's station, diagonal stays are mounted on both sides of the protective device, respectively, the lower ends of both diagonal stays being pivotally mounted on the brackets below the rear supports and the upper ends of both diagonal stays being pivotally mounted on the brackets about the middle of the roof located in the upper portion of the machine. Each diagonal stay is telescopic and spring loaded and is provided with a detachable restrainer for selectively restraining extention thereof.

On removing the restrainer, the diagonal stay can be extended to collapse the protective device. Then when the collapsed device is returned to an erect state, a spring within the diagonal stay retracts. At this time the spring restrainer is inserted to stop the diagonal stay from extension and to maintain the protective device erect. Thus, safe collapsing and raising procedures of the protective device become feasible by one operator.

It is the object of the present invention to provide an operator's station of a construction machine with a protective device usable as a canopy top, a head guard, a roll-over protective structure, etc. in combination such that the protective device is collapsible back and forth relative to the machine to obtain a labor saving device, which has not been the case before.

It is another object of the present invention to obtain a durable protective device sufficiently capable of holding stress and load of a heavyweight roof.

Still another object is to obtain a protective device capable of being raised or collapsed by one operator. A further object is to obtain a safe protective device in which there is no fear of an accident during the raising or collapsing operation.

BRIEF DESCRIPTION OF THE DRAWINGS

FIG. 2 is a side elevational view of a protective device of the present invention.

With reference to the accompanying drawings, an embodiment of the present invention will be described below.

DETAILED DESCRIPTION

Figure 1:
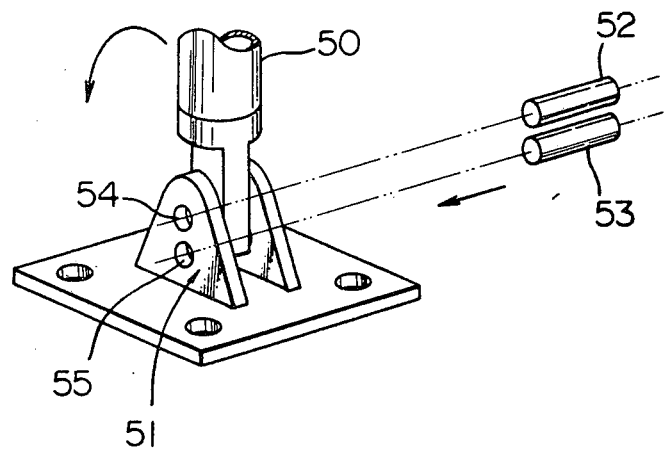
FIG. 1 shows a lower portion of a support of a conventional protective device, employing a standard pin connection thereat.
Figure 3:
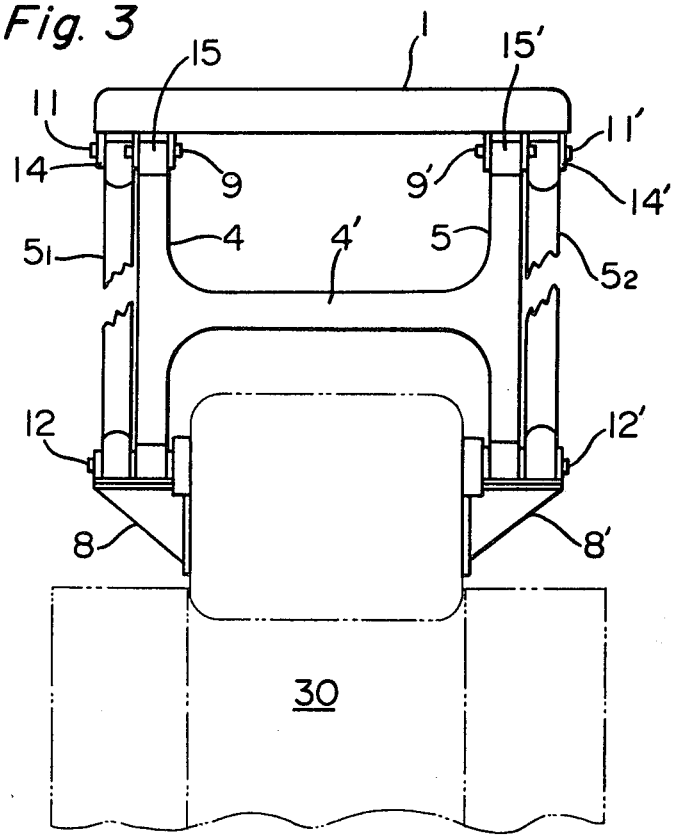
FIG. 3 is a rear elevational view of the above protective device.

In FIGS. 2 and 3, protective device A comprises roof 1, roof side brackets 13, 13', 14, 14', 15, 15', a pair of diagonal stays $5_1$, $5_2$, four supports or support means 2, 3, 4, 5 and machine side brackets, 6, 6', 8, 8'.

Clevis type brackets 13, 13' are secured at the lower front corners of roof 1 to connect a pair of front supports 2, 3 and a pair of clevis type brackets 14, 14' are secured under the center of the roof and more accurately slightly ahead of the center to connect a pair of diagonal stays $5_1$, $5_2$. Further clevis type brackets 15, 15' are secured at the lower rear corners to connect rear integrated supports 4, 5 of a cross member type. As shown all of the brackets are located in the same horizontal plane of the roof.

Since roof 1 is intended to be a sun-shade or to protect an operator's station 31 from a falling object, it is desirable for the structure of the roof to be formed of a heavyweight material having rigidity such as a steel plate and for the supports to be made of a steel pipe. Supports 2, 3, 4 and 5 are pivotally mounted on brackets 13, 13', 15, 15' of the roof by pivot pins 10, 10', 9, 9', respectively, and the pair of left and right diagonal stays $5_1$, $5_2$ are pivotally mounted on brackets 14, 14' by pivot pins 11, 11', respectively.

The lower connection portions of front supports 2, 3, left and right diagonal stays $5_1$, $5_2$ and rear supports 4, 5 are pivotally mounted on front brackets 6, 6', and rear brackets 8, 8' through pivot pins 7, 7', 12, 12', respectively.

Rear supports 4, 5 are connected to each other by means of horizontal stay 4' so that lateral vibrations of protective device A at the time of machine operations may be prevented.

Diagonal stay $5_1$ is slantingly disposed so as to connect bracket 14 about the lower center of roof 1 to rear bracket 8 in a diagonal line. Diagonal stay $5_2$ stands on the opposite side. Rear brackets 8, 8' are made branched and longer from side to side to work as a common bracket for holding diagonal stays $5_1$, $5_2$ outside and rear supports 4, 5 inside. The pin connections for each bracket, supports and diagonal stays are disposed to extend in a lateral direction.

Figure 4:
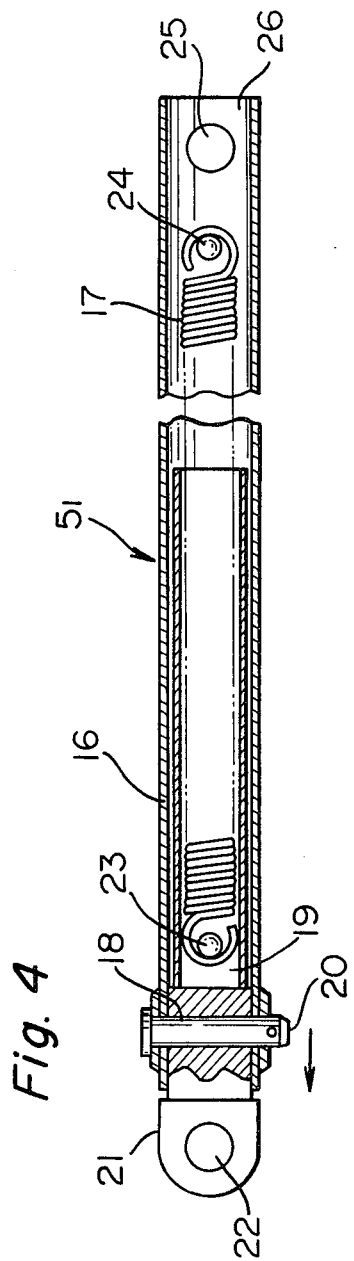
FIG. 4 is an enlarged cross section illustrating a diagonal stay employed in the protective device.

Diagonal stay $5_1$, as shown in Fig. 4, comprises outer cylinder 16 and slide shaft 21 telescopically disposed in the outer cylinder. The slide shaft is adapted to be extended in the direction of the illustrated arrow. Hole 18 is formed through the outer cylinder and the slide shaft for inserting restrainer pin 20 is therein to restrain axial movement of slide shaft 21 relative to outer cylinder 16. Numeral 22 depicts a pin boss on the shaft side and numerals 25 depicts a pin boss on the other cylinder end. Fittings 23, 24 for mounting spring member 17 are secured to the inner end 19 on one side of slide shaft 21 and the inner end 26 of outer cylinder 16. Spring member 17 is inserted between fittings 23 and 24 to connect slide shaft 21 and outer cylinder 16.

Accordingly restrainer 20 is removed to move slide shaft 21 in the arrow direction against the biasing force of spring member 17 with the fulcrum at check fittings 24. It is desirable to set the total length of slide shaft 21 at two-thirds of the total length of outer cylinder 16, or diagonal stay $5_1$.

As described above, since the supports for supporting the roof, diagonal stays and each bracket are so positioned that they can make a parallel link motion, raising or lowering of the protective device is feasible. In other words, the roof, supports and diagonal stays and brackets of the device are all laterally connected with pins to provide the protective device with a parallel link motion mechanism with which to make rotary movements back and forth with the fulcrum at each pin.

Protective device A can be moved between its full-line erected position and its collapsed phantom-line position in Fig. 2 under the telescopic control of left and right diagonal stays $5_1$, $5_2$.

In the normal erect state of protective device A, restrainer pins 20, 20' are engaged with diagonal stays $5_1$, $5_2$ to have slide shaft 21 restrained.

To put it in another way, when the diagonal stays are immovable, each support stands erect by the support of the diagonal stays and load from back and forth relative to the machine can be sufficiently sustained with the diagonal stays, In this stage, the length of the stays in shortest.

Then, when restrainer pins 20, 20' in the diagonal stays are pulled out and protective device A is pressed with hands, the diagonal stays start extending and the supports begin collapsing to shift the roof gradually forward and downward.

In other words, restraint of diagonal stays $5_1$, $5_2$ is released by the removal of the restrainer pins and they are rendered freely rotatable and if an external forward force is continuously given to them, they extend together with tension of the spring member in the slide shaft, and the protective device is changed into the most collapsed state.

Figure 5:
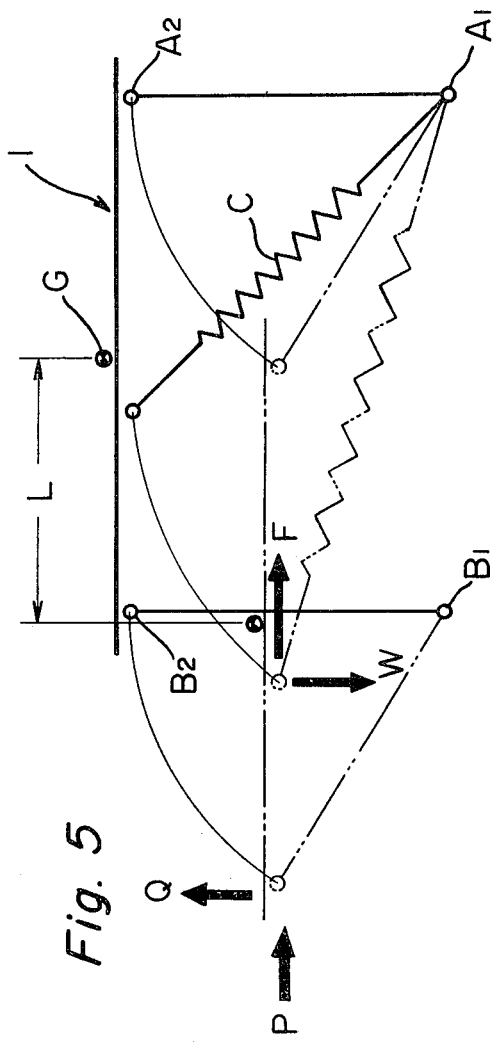
FIG. 5 is a diagram showing the rotating state of the protective device of the present invention.

In Fig. 5, for spring member 17, spring constant is set such that the difference between the turning moment of the protective device acting on spring C, which moment is horizontal component of force F obtained by rotating and shifting the supports in parallel with roof 1 and in radii $A_1$-$A_2$ and $B_1$-$B_2$ with the centers at $A_1$ and $B_1$ and balance of increase W of turning moment of weight due to displaced amount L of center of gravity G of the protective device, that is, the difference between (P+F) and (Q−W) is the most appropriate value. Symbol Q stands for a vertical component of force of external force.

Accordingly, external force P sustaining the protective device can be made smaller at the time of collapsing and recovering thereof.

A machine such as a construction machine is usually carried in a trailer because of its own low speed. However, the limitation of height of a machine by traffic laws has hitherto required complicated operations of removing a protective device. The present invention dispenses with such complicated operations and effects lowering or raising the protective device with each by pulling out the restrainer pins of the diagonal stays.

Particularly in the operating field in a tunnel, the protective device of the present invention is quite convenient for passage of a jumbo drill and desirable in operational efficiency.

The diagonal stays conducting the raising or lowering of the protective device extend and contract slowly under spring tension.

In the conventional protective device, at the time of collapsing, another operation to sustain the weight of the device is required in addition to detaching procedures of connecting portions. In contrast, in the present invention springs 17 of diagonal stays each extend with the extension of the diagonal stays and sustain the load of the supports at the time of collapsing, resulting in no need of additional operations.

The diagonal stays are disposed just on the side of the lower connecting point of the frame of the roof and the supports to collapse the protective device to a maximum.

Each support and diagonal stay is pivotally disposed and hence stress given to the connecting portions is easy to avoid. In addition, operations such as site assembling and transportation are very simple. And it is one of the merits that load in the forward and backward rotary directions due to vibrations of the supports is borne in the axial direction of the left and right diagonal stays arranged in a diagonal line and bending stress will not fall on the supports.

Further another merit of the present invention is that an operator's station is readily accessible because the erected positions of the diagonal stays are slightly inclined relative to the rear part.

It will be understood by the above descriptions that the protective device of the present invention excels the conventional device in durability and safety.

What is claimed is:

1. A collapsible canopy assembly for protecting an operator's station comprising
    a roof,
    a normally upright front support means having an upper end thereof pivotally connected to said roof,
    a normally upright rear support means spaced longitudinally from said front support means and having an upper end thereof pivotally connected to said roof to form a parallelogram-type linkage with said roof and front support means,
    at least one telescopic stay diagonally disposed and pivotally interconnected between said roof and adjacent to a lower end of one of said front and rear support means, said stay comprising a slide shaft telescopically mounted in a cylinder and spring means interconnected between said slide shaft and said cylinder for normally retracting the same, and releasable retaining means normally engaging said stay for preventing axial movement of said slide shaft relative to said cylinder when said stay is in its retracted condition and releasable therefrom for permitting extension of said stay against the biasing force of said spring means upon collapse of said canopy.

2. The canopy assembly of claim 1 wherein each of said front and rear support means comprises a pair of laterally spaced supports each having a lower end thereof pivotally mounted on a support bracket.

3. The canopy assembly of calim 2 wherein each one of said support brackets is secured on a construction vehicle.

4. The canopy assembly of calim 1 comprising a pair of said stays and wherein an upper end of each stay is pivotally mounted on a bracket secured to said roof, intermediate the upper ends of said front and rear support means.

5. The canopy assembly of claim 4 wherein a lower end of each stay is pivotally mounted on a support bracket having the lower end of a respective support of said rear support means pivotally mounted thereon.

6. The canopy assembly of claim 2 wherein said rear support means further comprises a horizontally disposed stay secured between the supports thereof.

7. The canopy assembly of claim 1 wherein said retaining means comprises means forming a common bore transversely through said slide shaft and said cylinder and a pin normally disposed in said bore.

8. The canopy assembly of claim 1 wherein said slide shaft has an axial length approximating two-thirds of the axial length of said cylinder.

* * * * *

UNITED STATES PATENT AND TRADEMARK OFFICE
CERTIFICATE OF CORRECTION

PATENT NO. : 3,912,297
DATED : October 14, 1975
INVENTOR(S) : YOSHIJI MITSUISHI and TOMIO UCHIDA It is certified that error appears in the above-identified patent and that said Letters Patent are hereby corrected as shown below:

Title Page, [73] Assignee, should be:

CATERPILLAR MITSUBISHI LTD.,
Tokyo, Japan

Signed and Sealed this thirteenth Day of April 1976

[SEAL]

Attest:

RUTH C. MASON
Attesting Officer

C. MARSHALL DANN
Commissioner of Patents and Trademarks